United States Patent
Vusirikala et al.

(10) Patent No.: US 6,483,637 B2
(45) Date of Patent: Nov. 19, 2002

(54) SYSTEM AND METHOD FOR PER-BAND OPTICAL AMPLIFICATION

(75) Inventors: Vijayanand Vusirikala, Woburn, MA (US); Matthew W. Connolly, Grafton, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/823,404

(22) Filed: Mar. 30, 2001

(65) Prior Publication Data

US 2002/0141047 A1 Oct. 3, 2002

(51) Int. Cl.[7] ................................................ H01S 3/00
(52) U.S. Cl. ...................................... 359/349; 359/337.1
(58) Field of Search ............................... 359/349, 337.1

(56) References Cited

U.S. PATENT DOCUMENTS

| | | | |
|---|---|---|---|
| 5,452,116 A | * | 9/1995 | Kirkby et al. ............... 359/124 |
| 5,471,335 A | | 11/1995 | Nitta ............................ 359/179 |
| 5,579,155 A | | 11/1996 | Kitamura ..................... 359/344 |
| 5,673,141 A | | 9/1997 | Gambini ...................... 359/341 |
| 6,104,527 A | * | 8/2000 | Yang ........................... 359/341 |
| 6,144,488 A | | 11/2000 | Okuno ......................... 359/341 |
| 6,151,158 A | | 11/2000 | Takeda et al. ............... 359/341 |
| 6,151,160 A | | 11/2000 | Ma et al. ..................... 359/341 |
| 6,160,658 A | | 12/2000 | Ishikawa ..................... 359/337 |
| 6,307,668 B1 | * | 10/2001 | Bastein et al. ............ 359/337.1 |

FOREIGN PATENT DOCUMENTS

EP        1005188        5/2000

* cited by examiner

*Primary Examiner*—Mark Hellner
(74) *Attorney, Agent, or Firm*—Lahive & Cockfield, LLP

(57) ABSTRACT

A method and apparatus for amplifying an optical signal is provided. In accordance with one example embodiment of the invention, the optical amplification system includes an optical signal traveling through the system. At least one module of the optical amplification system is suitable for one of selectively separating and combining one or more individual sub-bands of the optical signal. At least one amplifier is disposed to separately amplify each of the one or more individual sub-bands.

26 Claims, 6 Drawing Sheets

SYSTEM AND METHOD FOR PER-BAND OPTICAL AMPLIFICATION

FIELD OF THE INVENTION

The invention relates to optical networks, and more particularly relates to a system and method for per-band amplification of optical signals.

BACKGROUND OF THE INVENTION

In optical networks, including dense wavelength division multiplexing (DWDM) optical networks, amplification of the optical signals is often required to traverse lengthy spans of fiber. Known methods of amplification utilize a single erbium doped fiber amplifier (EDFA) at, e.g., terminals, add/drop nodes and in-line amplifier nodes, with all DWDM channels sharing the same amplifiers as they pass through any one node. The EDFAs typically require more than one pump laser to achieve the output power required to support and amplify all of the channels or sub-bands passing through the node. The single EDFA solution also requires, in most instances, a gain flattening filter (GFF) to equalize the amount of gain for all of the channels across the usable bandwidth. The usable bandwidth is typically approximately 30 nm for a 40-channel system. These factors result in a relatively higher cost amplifier, and a relatively higher initial deployment cost, regardless of the number of channels initially deployed.

In certain optical network configurations, channels can be added/multiplexed relatively close to the ultimate destination point. These channels may require no optical amplification prior to arriving at the destination node. However, these channels share the same fiber with channels that have traveled significant distances over more lengthy spans of fiber, and hence require amplification. Both channels that do not require amplification as well channels that do require amplification, in present day network configurations, pass through at least one optical amplifier that amplifies all of the signals. This results in unnecessary amplification of those channels not requiring amplification, and a less efficient use of the available amplifier power.

SUMMARY OF THE INVENTION

There is a need for a more cost effective and more efficient optical amplification system for use in an optical network. The present invention is directed toward further solutions to address this existing need.

In accordance with one example embodiment of the invention, an optical amplification system includes an optical signal traveling through the optical amplification system. At least one amplifier is disposed to separately amplify each of the individual sub-bands.

At least one module of the optical amplification system is suitable for selectively separating or combining one or more individual sub-bands of the optical signal, in accordance with one embodiment of the invention.

A typical metropolitan optical network has a total of 160 wavelengths that are available for transmitting data. These wavelengths are divided into C and L bands, with 80 wavelengths in each band. Each C and L band is further divided into even and odd groupings, with 40 wavelengths in each group. Sub-bands, as referred to herein, comprise sub-groupings of the 40 wavelengths of each even and odd group, e.g., with three, four, or five wavelengths in each sub-band. The number of wavelengths in each sub-band, as understood by one of ordinary skill in the art, can vary depending at least partially on the application of the particular network. The examples illustrated herein utilize four wavelengths for each sub-band.

The module can be a bandpass filter, a channel add device, a channel drop device, a demultiplexer, a multiplexer, and/or the like.

The optical amplification system can be placed in an optical network where less than an entirety of optical sub-bands traveling through the network requires amplification. The optical amplification system, in such an instance, has disposed at least one amplifier to amplify each individual sub-band requiring amplification, and has disposed no amplifiers to amplify sub-bands not requiring amplification.

In accordance with another example embodiment of the invention, a method of optical sub-band amplification includes the step of providing an optical signal. The method also includes separating the optical signal into one or more sub-band, and then separately and individually amplifying the sub-band with one or more amplifiers.

According to further aspects of the invention, the separating step can occur by passing the optical signal through at least one bandpass filter, passing the optical signal through at least one demultiplexer, or passing the optical signal through at least one channel drop device.

In accordance with another example embodiment of the invention, a method of optical sub-band amplification, includes the step of providing an optical sub-band signal. The method continues by amplifying the optical sub-band signal with an amplifier. The optical sub-band signal is then combined with other sub-band signals, wherein one or more of the other sub-band signals has been separately and individually amplified by one or more amplifiers.

In such a method, the combining step can occur by passing the optical sub-band signal through at least one channel add device, or by passing the optical sub-band signal through at least one multiplexer.

In accordance with still another example embodiment of the invention, an optical amplification node is provided in an optical network. The optical network includes at least one optical signal propagating through the network. The optical amplification node includes at least one module, suitable for one of selectively separating and combining one or more individual sub-bands of the at least one signal. At least one amplifier is disposed to separately amplify the one or more individual sub-bands.

The optical amplifier node, in such an arrangement, includes at least one module in the form of a bandpass filter, a channel add device, a channel drop device, a multiplexer, and a demultiplexer.

In accordance with still another embodiment of the present invention, the optical amplifier node can be utilized as a per-band attenuator by not pumping the gain region.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1:
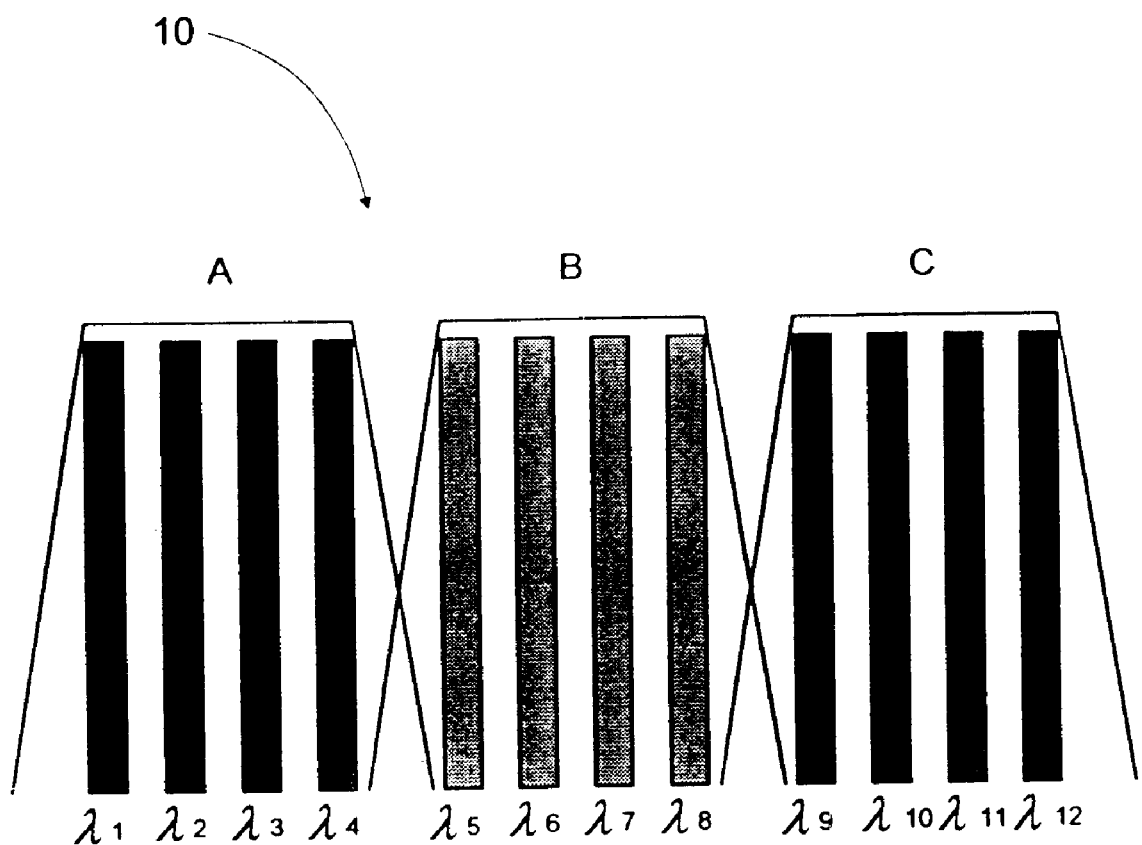
FIG. 1 is a representation of an optical signal according to one aspect of the invention.

The present invention generally relates to per-band amplification of optical channels in an optical network. Per-band amplification utilizes relatively small and inexpensive erbium doped fiber amplifiers, erbium doped waveguide amplifiers, or semiconductor optical amplifiers. Per-band amplifiers require only a single pump laser in the case of erbium doped amplifiers and do not require a gain flattening filter. The filtering of all channels into channel bands and amplification of each band individually and separately provides for the desired gain and power levels. Per-band amplification provides a more cost effective and efficient mechanism for amplifying certain optical network configurations.

FIGS. 1 through 6, wherein like parts are designated by like reference numerals throughout, illustrate example embodiments of optical networks and per-band amplification systems according to example aspects of the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

FIG. 1 illustrates an example optical signal 10 in accordance with aspects of the present invention. The optical signal 10 is a DWDM optical signal comprised of three channel bands, illustrated as band A, band B, and band C. The optical signal 10 can be a wavelength division multiplexing (WDM) signal, non-multiplexing signal, DWDM signal, and the like.

The channel bands A, B, and C are contiguous sub-sets of the entire operational bandwidth of the optical signal 10. Each band A, B, and C is comprised of four different wavelengths. The wavelengths are illustrated as $\lambda 1$ through $\lambda 12$. The channel bands A, B, and C, as illustrated, are also known as sub-bands A, B, and C, in accordance with aspects of the present invention. The selection of four wavelengths for each sub-band is based on multiple factors. If the sub-bands are greater than four wavelengths, there is an increased likelihood of gain flattening issues to surface, requiring the gain flattening filters utilized with larger full signal amplifiers. On the other hand, if the sub-bands are less than four wavelengths, the number of per-band amplifiers required for a network installation may be higher than is otherwise necessary to avoid the gain flattening issues. However, as previously mentioned, the present invention is applicable to networks having sub-bands containing any number of possible different wavelengths.

Figure 2:
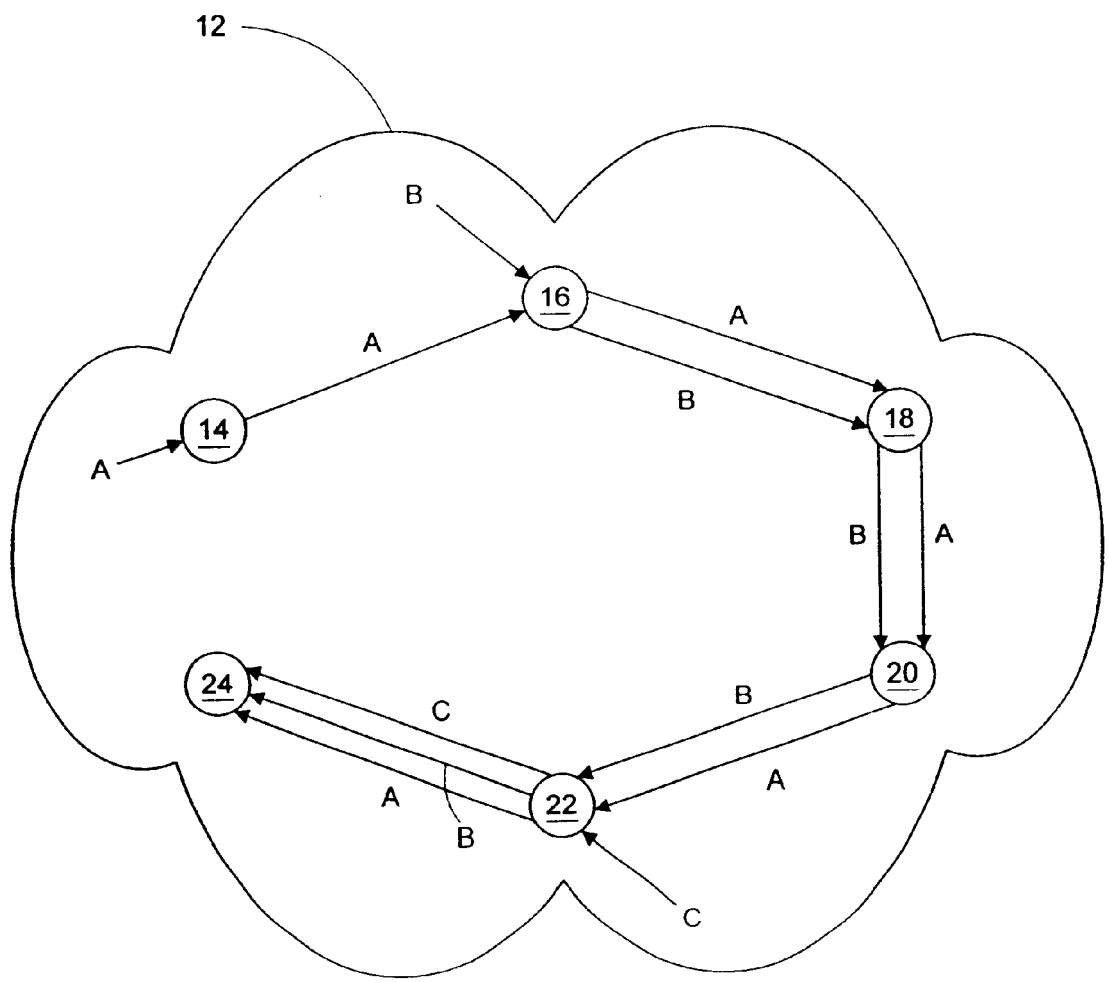
FIG. 2 is a representation of a metropolitan network according to one embodiment of the invention.

One application of the example embodiments of the present invention is the environment of a metropolitan optical network 12 as depicted in FIG. 2. No amplifiers are shown for the sake of simplicity. A metropolitan network is a data network designed for a town or city. In terms of geographic breadth, metropolitan area networks are larger than local-area networks (LANs), but smaller than wide-area networks (WANs). A LAN is a computer network that spans a relatively small area. LANs are typically confined to a single building or group of buildings, and are most often in the form of an Ethernet or Apple Talk. However, one LAN can be connected to other LANs over any distance via telephone lines, fiber optical lines, and radio waves. A system of LANs connected in this way forms a long haul network, or a WAN. The largest WAN is the Internet. Most LANs connect workstations and personal computers. WANs are usually characterized by very high-speed connections using fiber optical cable or other digital media.

The example metropolitan optical network 12 has a first sub-band A entering a first node 14. One of ordinary skill will readily recognize that the illustrated optical network 12 can comprise any number of nodes or intersections, and the optical signal can comprise any selected number of sub-bands that can be introduced or removed at any particular node.

Sub-band A propagates from the first node 14 to a second node 16, where a second sub-band B is introduced to the network through the second node 16. Sub-band A combines with sub-band B in the second node 16, and both bands A and B propagate to the third node 18. There is no alteration or modification of the sub-bands at the third node 18, and the sub-bands A and B propagate from the third node 18 to the fourth node 20. In the present example, there is again no alteration or modification of sub-bands at the fourth node 20, thus the sub-bands A and B propagate to the fifth node 22. A third sub-band C is also introduced to the network at the fifth node 22. Sub-bands A and B combine with the third sub-band C, and all three sub-bands A, B, and C propagate to a sixth node 24.

The addition of sub-band A at the first node 14, sub-band B at the second node 16, and sub-band C at the fifth node 22, can be executed utilizing a number of different technologies, such as bandpass filters, channel add devices, and/or channel multiplexers. It should be noted that each sub-band A, B, and C enters the metropolitan network 12 at different locations, and therefore each sub-band A, B, and C travels a different relative distance from each point of entry to the final destination at the sixth node 24.

The network illustrated in FIG. 2 has no amplifiers shown. Such a network configuration, depending on actual geographical layout, typically requires at least one amplifier placed at one or more nodes throughout the network.

Figure 3:
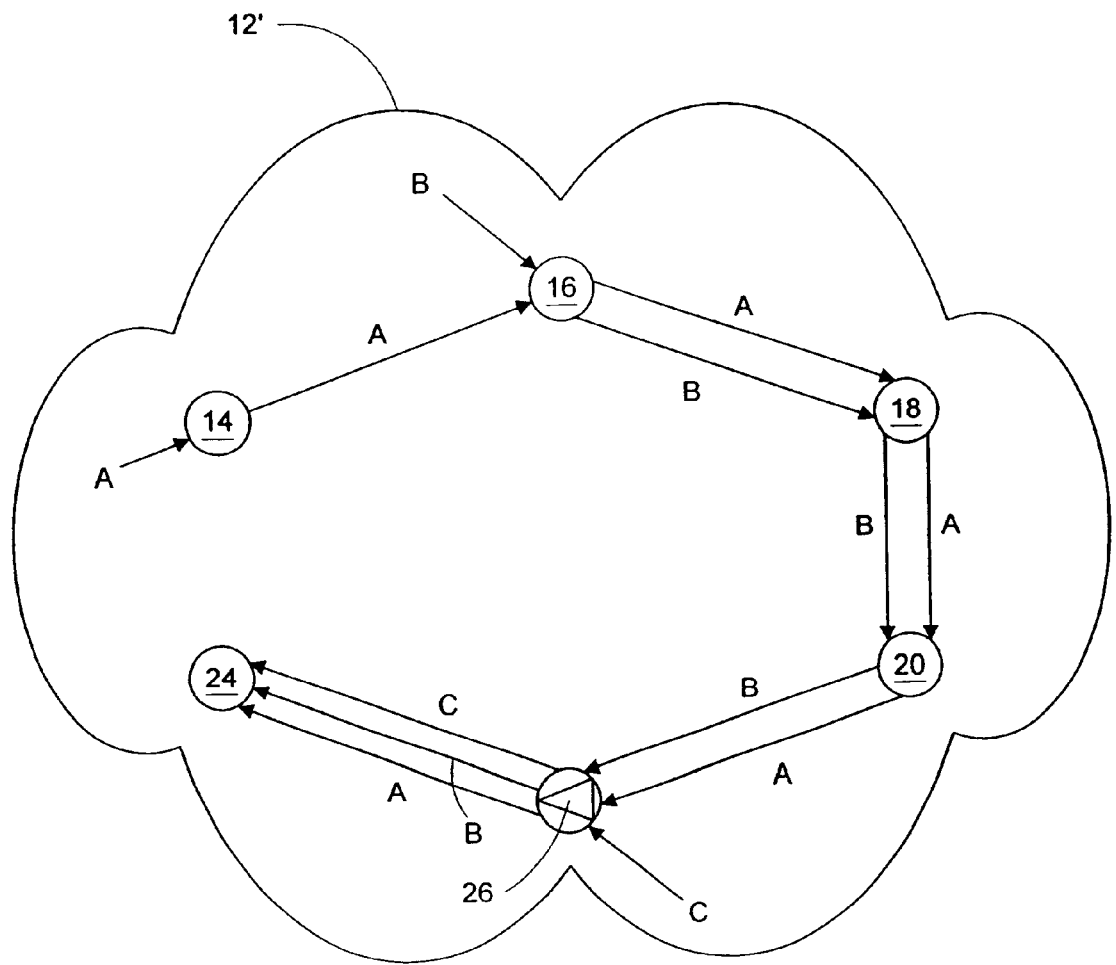
FIG. 3 is a representation of a metropolitan network according to a known arrangement for such networks.

FIG. 3 illustrates a known metropolitan optical network 12' arrangement that employs a typical amplifier node 26. As in the previously depicted metropolitan network 12, sub-band A enters the first node 14 and propagates to the second node 16, where sub-band B combines with sub-band A. Sub-bands A and B then propagate to the third node 18 and the fourth node 20. The fifth node in the metropolitan optical network 12' is the typical amplifier node 26. Sub-band A and sub-band B propagate from the fourth node 20 to the amplifier node 26, where sub-band C combines with sub-bands A and B. The amplifier node 26 amplifies each of the sub-bands A, B, and C by an equal amount, regardless of whether all of the sub-bands A, B, and C need amplification at this juncture. The combined and amplified sub-bands A, B, and C then propagate to the sixth node 24, which is the final destination node.

The conventional optical network 12' also typically includes at least one gain flattening filter (not shown) to equalize the gains of the various sub-bands A, B, and C as they pass through the amplifier node 26. There may also be a need for one or more optical signal attenuators (not shown) to attenuate any optical signals that are amplified in the amplifier node 26 to a level greater than required or necessary for the particular network 12' configuration.

Figure 4:
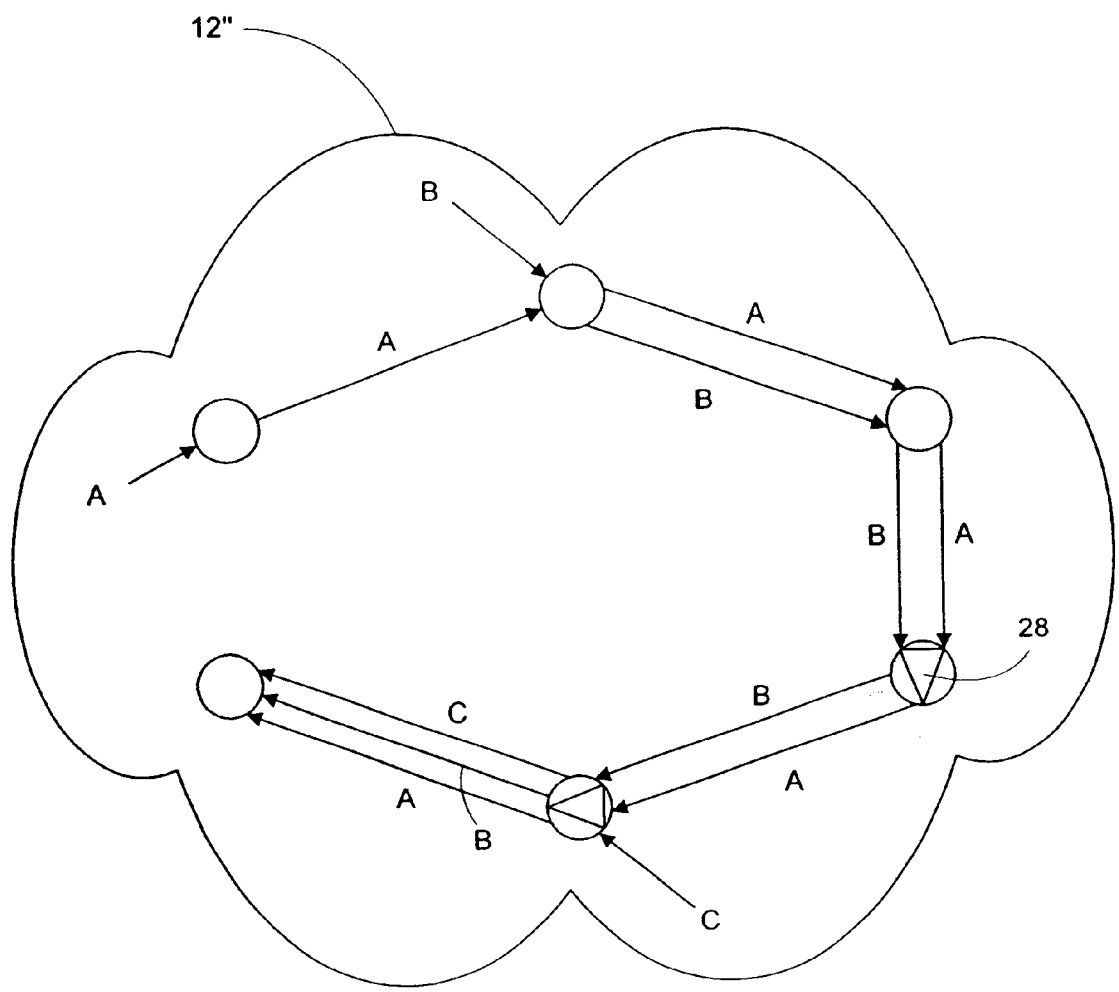
FIG. 4 is a representation of an optical network according to still another embodiment of the invention.

FIG. 4 illustrates a metropolitan optical network 12' in accordance with one example embodiment of the present invention. Sub-band A is introduced to the network at the first node 14 and propagates to the second node 16 where sub-band B is introduced to the network. The combined sub-bands A and B propagate to the third node 18. The metropolitan optical network 12" includes a per-band amplifier node 28 at the location of a fourth node position. The combined sub-bands A and B propagate from the third node 18 to the per-band amplifier node 28. The per-band amplifier 28 can be configured to amplify both sub-band A and sub-band B, if required. Alternatively, because sub-band B has traveled a lesser distance than band A, sub-band B may not require amplification at node 28, and therefore the amplifier node 28 can amplify only sub-band A. If, for some reason not apparent as illustrated, sub-band B required amplification, but sub-band A did not, the per-band amplifier node 28 can amplify only B if desired. Hence, the present invention can selectively or optionally amplify one or more sub-bands based on need.

Sub-bands A and B propagate to another per-band amplifier node 30, where sub-band C combines with sub-bands A and B. The per-band amplifier node 30 is configured in a similar manner to the previous per-band amplifier node 28.

Several possibilities exist at the juncture of the per-band amplifier node 30. One possibility is that sub-band C requires no amplification, while sub-bands A and B both require amplification. In such an instance, one can configure the amplifier node 30 to amplify sub-bands A and B, but not sub-band C.

Another possibility is that sub-bands B and C do not require amplification because sub-band B was previously amplified at amplifier node 28, while sub-band C has not traveled sufficient distance to require amplification. In such an instance, the amplifier node 30 can amplify sub-band A, but not sub-bands B and C.

A third potential scenario is that sub-band A was previously amplified at amplifier node 28, but sub-band B was not. Sub-band C does not require amplification because it has traveled a relatively short distance. In such an instance, the amplifier node 30 amplifies sub-band B, but not sub-bands A or C.

If all of the sub-bands A, B, and C require amplification upon arrival at the amplifier node 30, the amplifier 30 can amplify all three sub-bands A, B, and C.

The decision to amplify one or more of the sub-bands A, B, and C is one that is made during the formation of the network. Alternatively, the decision to amplify a particular sub-band A, B, or C, or not, can be modified after the network is already in place. If additional sub-bands are added to the network, the amplifier nodes 28 and 30 can accommodate such additional sub-bands and any additional amplification requirements.

The combined sub-bands A, B, and C, after passing through the amplifier node 30, propagate to the final destination node, the sixth node 24.

Figure 5:
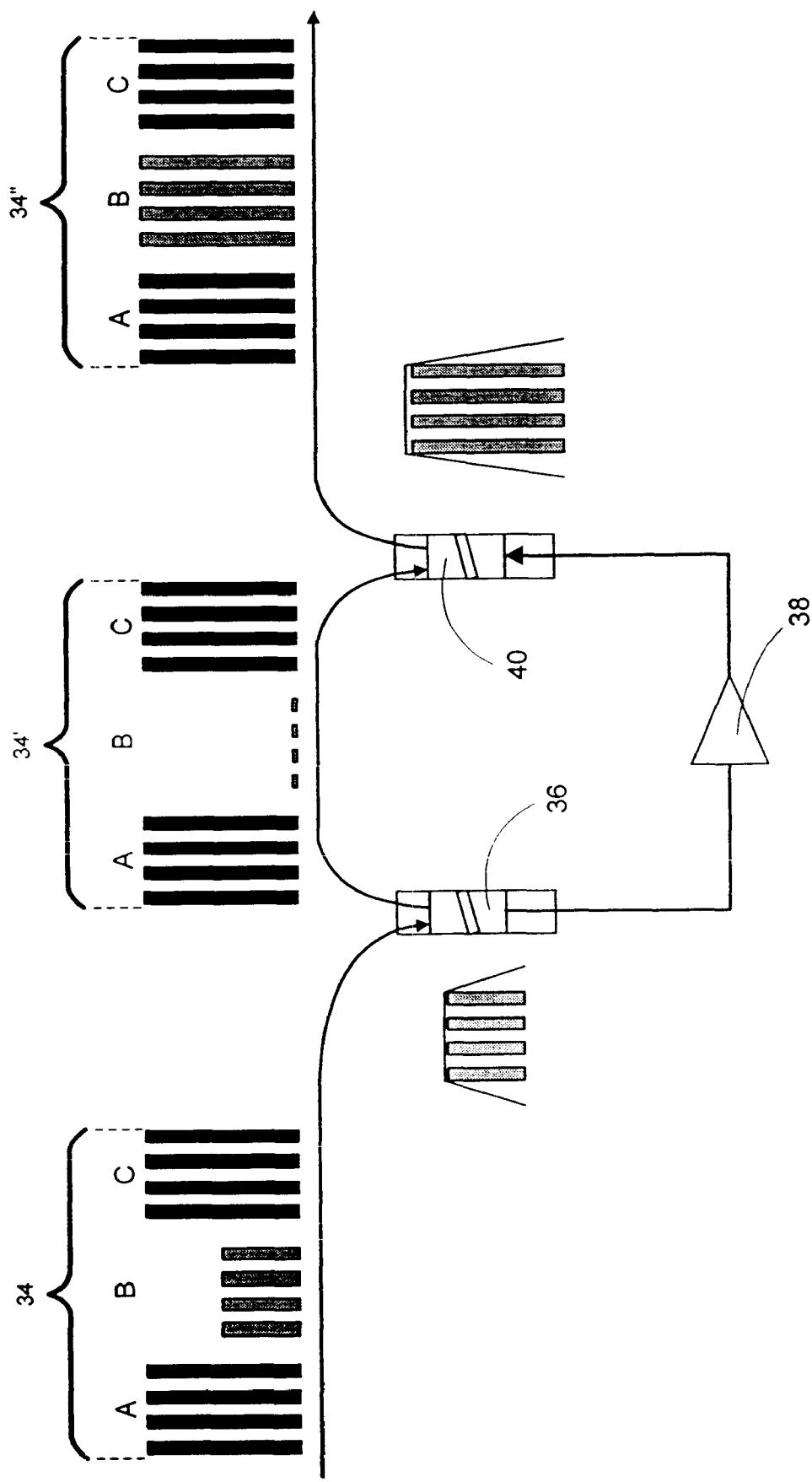
FIG. 5 is a diagrammatic illustration of an optical amplifier node according to one embodiment of the invention.

FIG. 5 further illustrates one example of selective per sub-band amplification carried out by a per-band amplifier according to one embodiment of the present invention. An optical signal 34 can be comprised of sub-bands A, B, and C. Sub-bands A and C are at a desired amplification level, while sub-band B requires additional amplification. The optical signal 34 enters a first module 36, and sub-band B exits the first module 36 in the direction of a per-band amplifier 38, while sub-bands A and C exit the first module 36 in the direction of a second module 40. Sub-band B then passes through the per-band amplifier 38. The per-band amplifier 38 amplifies sub-band B to an appropriate amplification level relative to sub-bands A and C. Sub-band B propagates from the per-band amplifier 38 to the second module 40, where sub-band B combines with sub-bands A and C. Sub-bands A, B, and C exit the second module 40, with each of the sub-bands A, B, and C being substantially equivalently amplified to selected power levels.

The first module 36 and the second module 40 can be one of a number of different devices. The term module, as utilized herein, means one of several different devices, such as a bandpass filter, a channel add device, a channel drop device, a demultiplexer, or a multiplexer, depending on the required function. Examples of other devices are known in the art.

Figure 6:
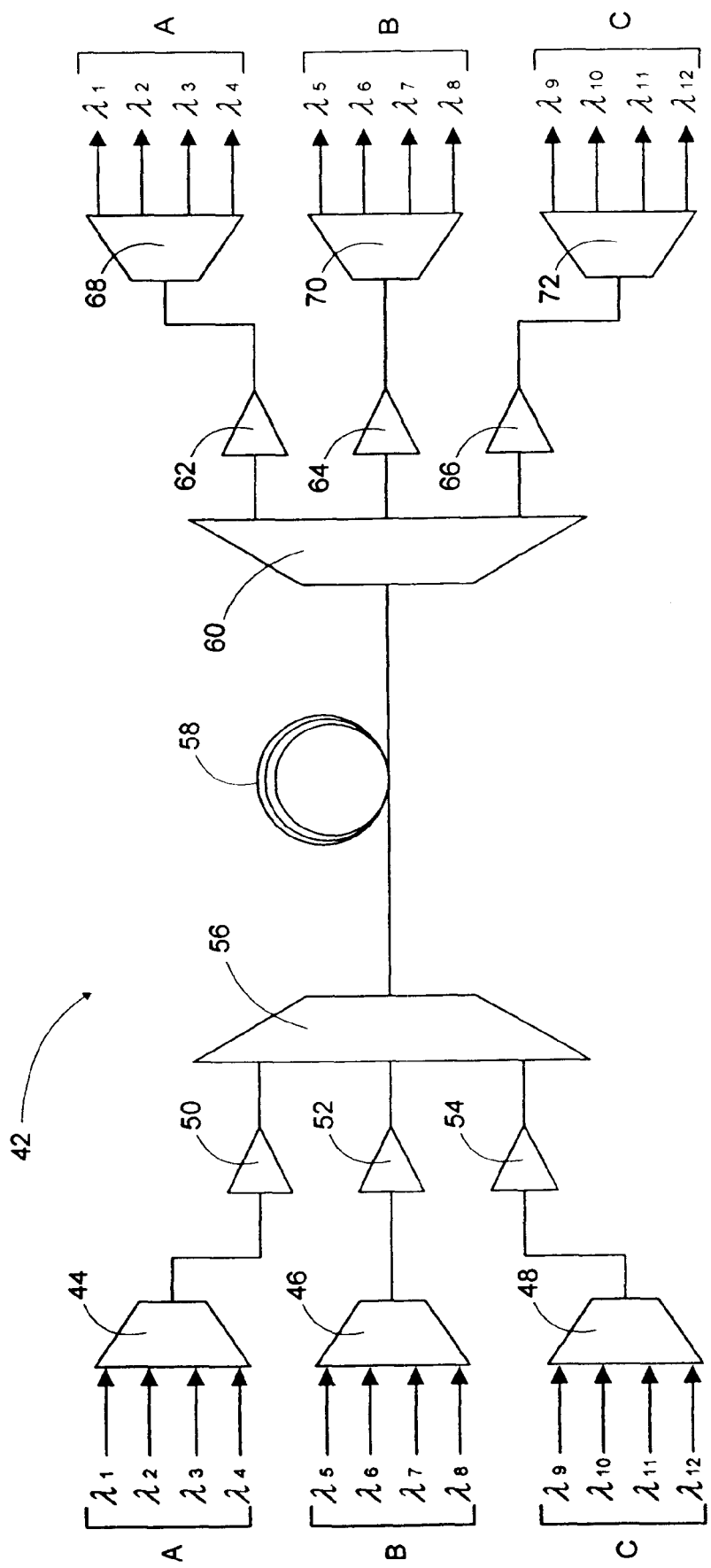
FIG. 6 is a diagrammatic illustration of a section of an optical network according to one embodiment of the invention.

FIG. 6 illustrates a portion of yet another optical network 42 configuration. Sub-band A comprises wavelengths $\lambda 1$ through $\lambda 4$, sub-band B comprises wavelengths $\lambda 5$ through $\lambda 8$, and sub-band C comprises wavelengths $\lambda 9$ through $\lambda 12$. Wavelengths $\lambda 1$ through $\lambda 4$ enter a first module 44 and combine to form sub-band A. Wavelengths $\lambda 5$ through $\lambda 8$ enter a second module 46 and combine to form sub-band B. Wavelengths $\lambda 9$ through $\lambda 12$ enter a third module 48 and combine to form sub-band C. Sub-band A propagates through a first per-band amplifier 50. Sub-band B propagates through a second per-band amplifier 52. Sub-band C propagates through a third per-band amplifier 54, and each of the per-band amplifiers 50, 52, and 54 amplify the corresponding sub-bands A, B, and C.

The amplified sub-bands A, B, and C exit each of the per-band amplifiers 50, 52, and 54, and enter a fourth module 56, where the sub-bands combine to form a band. The combined channels A, B, and C travel a distance through the fiber span 58 of predetermined length, and arrive at a fifth module 60.

The fifth module 60 separates the band into each of the sub-band components A, B, and C. Sub-band A passes through a per-band amplifier 62, sub-band B passes through a per-band amplifier 64, and sub-band C passes through a per-band amplifier 66. The amplified sub-bands A, B, and C each propagate to a corresponding module, e.g., a sixth module 68, a seventh module 70, and an eighth module 72. Each of the modules 68, 70, and 72 additionally separates each sub-band into individual wavelengths. Sub-band A separates into wavelengths $\lambda 1$ through $\lambda 4$, sub-band B separates into wavelengths $\lambda 5$ through $\lambda 8$, and sub-band C separates into wavelengths $\lambda 9$ through $\lambda 12$. Each of the wavelengths $\lambda 1$ through $\lambda 12$ continues to propagate through the network, as designed.

A significant feature of the present invention is the utilization of per-band amplifiers on a per sub-band basis to improve scalability and amplifier efficiency, while concomitantly reducing initial deployment costs. A typical metropolitan network currently utilizes approximately 8 wavelengths. If the wavelengths were grouped into two sub-bands, each having four wavelengths, only two of the less costly per-band amplifier nodes are needed at periodic locations to amplify the optical signals, rather than one much more costly full signal amplifier node.

The application of a per-band amplifier on individual sub-bands allows for the mixing of 2.5 Gbps (Gigabits per second) network data rates, 10 Gbps network data rates, and any other optical data rate utilized.

Amplifier output power is shared by only the number of waves in any one band, and not by the total capacity of a particular system. It is therefore possible to obtain higher per-channel power using per-band amplification. Such an advantage can improve the span rules.

One of ordinary skill in the art will additionally recognize that gain of the per-band or sub-band amplifier of the present invention is selectable. There can be a positive gain, a zero gain, or even a negative gain. In the case of a negative gain, the optical amplifier acts as an attenuator. The same or similar structures as disclosed herein for signal amplification, as well as others understood by one of ordinary skill in the art, can then utilize the sub-band amplifier-attenuator where the optical gain is not pumped, to attenuate predetermined sub-bands traveling through an optical network in a same or similar manner to the arrangements disclosed herein. The ability to attenuate specific sub-bands can remove or substantially reduce the need to later regenerate or amplify wavelengths that were unintentionally attenuated by a larger, full band, attenuator as under known arrangements.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Other details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A sub-band optical amplification system for an optical network, comprising:
    an optical signal having a plurality of sub-bands, each sub-band having a number of wavelengths sufficiently small to negate a need for gain adjustment before or after amplification; and
    one or more amplifiers in circuit with one or more of said plurality of sub-bands, such that no more than one sub-band is amplified by any one amplifier, and only sub-bands requiring amplification are amplified.

2. The system of claim 1, further comprising at least one module suitable for one of selectively separating and combining one or more individual sub-bands of said signal.

3. The system of claim 2, wherein said at least one module comprises a band pass filter.

4. The system of claim 2, wherein said at least one module comprises a channel add device.

5. The system of claim 2, wherein said at least one module comprises a channel drop device.

6. The system of claim 2, wherein said at least one module comprises a demultiplexer.

7. The system of claim 2, wherein said at least one module comprises a multiplexer.

8. The system of claim 1, wherein less than an entirety of said plurality of sub-bands requires amplification.

9. The system of claim 8, wherein said one or more amplifiers are disposed to amplify said less than an entirety of said plurality of sub-bands.

10. The system of claim 1, wherein one of said one or more amplifiers is disposed to amplify each of said individual sub-bands.

11. The system of claim 1, wherein each of said one or more sub-bands is comprised of four different wavelengths.

12. A method of optical sub-band amplification, comprising the steps of:
    providing an optical signal;
    separating said optical signal into a plurality of sub-bands, each sub-band having a number of wavelengths sufficiently small to negate a need for gain adjustment before or after amplification; and
    passing one or more of said plurality of sub-bands each through a separate amplifier, in a manner such that only sub-bands requiring amplification are amplified.

13. The method of claim 12, wherein said separating step comprises the step of passing said optical signal through at least one band pass filter.

14. The method of claim 12, wherein said separating step comprises the step of passing said optical signal through at least one demultiplexer.

15. The method of claim 12, wherein said separating step comprises the step of passing said optical signal through at least one channel drop device.

16. A method of optical sub-band amplification, comprising the steps of:
    providing an optical sub-band signal, each sub-band signal having a number of wavelengths sufficiently small to negate a need for gain adjustment before or after amplification;
    amplifying said optical sub-band signal with an amplifier in a manner such that only sub-band signals requiring amplification are amplified; and
    combining said optical sub-band signal with other sub-band signals, wherein one or more of said other sub-band signals has been separately and individually amplified by one or more amplifiers.

17. The method of claim 16, wherein said combining step comprises passing said optical sub-band signal through at least one channel add device.

18. The method of claim 16, wherein said combining step comprises passing said optical sub-band signal through at least one multiplexer.

19. In an optical network, an optical amplification node, comprising:
    at least one optical signal propagating through said network, said signal having a plurality of sub-bands, each sub-band having a number of wavelengths sufficiently small to negate a need for gain adjustment before or after amplification;
    at least one module, suitable for one of selectively separating and combining one or more of said plurality of sub-bands; and
    at least one amplifier disposed to separately amplify each of said one or more individual sub-bands in a manner such that only sub-bands requiring amplification are amplified.

20. The optical amplifier node of claim 19, wherein said sub-bands are comprised of four different wavelengths.

21. The optical amplifier node of claim 19, wherein said at least one module is one of a band pass filter, a channel add device, a channel drop device, multiplexer, and a demultiplexer.

22. A sub-band optical attenuation system for an optical network, comprising:
    an optical signal having a plurality of sub-bands, each sub-band having a number of wavelengths sufficiently small to negate a need for gain adjustment before or after amplification; and
    one or more amplifiers in circuit with one or more of said plurality of sub-bands, said amplifiers configured not to pump optical gain and thus performing as optical attenuators, such that no more than one sub-band is attenuated by any one optical amplifier and only sub-bands requiring amplification are amplified.

23. The system of claim 22, further comprising at least one module suitable for one of selectively separating and combining one or more individual sub-bands of said signal.

24. The system of claim 22, wherein less than an entirety of said plurality of sub-bands requires attenuation.

25. The system of claim 24, wherein said one or more amplifiers are disposed to attenuate said less than an entirety of said plurality of sub-bands.

26. The system of claim 1, wherein one of said one or more amplifiers is disposed to attenuate each of said individual sub-bands.

* * * * *